United States Patent [19]

Rabbiosi

[11] 3,986,486
[45] Oct. 19, 1976

[54] REDUCTION OF HYDROCARBONS EMISSIONS IN CARBURETED ENGINES

[76] Inventor: Clare P. Rabbiosi, 1311 Ash St., Hayward, Calif. 94541

[22] Filed: Oct. 21, 1974

[21] Appl. No.: 516,606

[52] U.S. Cl. .................... 123/122 E; 123/122 H; 123/133
[51] Int. Cl.² .................................... F02M 31/00
[58] Field of Search ........ 123/122 R, 122 H, 122 A, 123/122 E, 133; 261/144–145, 142

[56] References Cited
UNITED STATES PATENTS

| 1,300,600 | 4/1919 | Giesler | 123/122 E |
| 2,414,296 | 1/1947 | Gill | 123/122 H |
| 2,464,047 | 3/1949 | Larkin | 123/122 H |
| 3,354,872 | 11/1967 | Gratzmuller | 123/122 E |
| 3,787,037 | 1/1974 | Motooki | 123/122 H |
| 3,828,747 | 8/1974 | Nambu | 123/122 H |
| 3,913,543 | 10/1975 | Richard | 123/122 E |

OTHER PUBLICATIONS
J. C. Whitney & Co., Automotive Accessories & Parts Catalogue–1971, p. 148, "Fuel Pressure Regulator".

Primary Examiner—Ronald H. Lazarus
Attorney, Agent, or Firm—Owen, Wickersham & Erickson

[57] ABSTRACT

A device for attachment to a carbureted automobile engine for improving its performance, both by reduction of pollutants by obtaining more complete burning of the fuel and by obtaining better gasoline mileage, especially in city and other stop-start driving. The fuel is passed into a heat exchanger between the fuel pump and the carburetor. The heat exchange utilizes the water pump and water from the radiator in conjunction with a heat sensor located close to the carburetor to feed the gasoline to the carburetor at temperatures depending on the prevailing weather and climate, i.e., at about 110° to 120°F. in winter in northern California and about 125° to 145°F. in the summer there. The temperature is kept within a range of 5°–6°F. A pressure regulator is interposed between the heat exchanger and the heat sensor for regulating the pressure of the fuel fed to the carburetor, so that it will be about 3 pounds per square inch.

3 Claims, 5 Drawing Figures

REDUCTION OF HYDROCARBONS EMISSIONS IN CARBURETED ENGINES

BACKGROUND OF THE INVENTION

This invention relates to apparatus and method for improving the efficiency of a carbureted vehicle engine, such as an automobile or truck engine.

Many attempts have been made to reduce the hydrocarbons emissions from engines, and many attempts have been made to improve the operating efficiencies.

It has long been recognized that fuel burns more efficiently and produces fewer emissions when it enters the engine hot. More than 50 years ago people were warming fuel in order to use rather poor fuels, such as kerosene, in automobile engines, but the present invention is not related to such reasons. Rather, the present invention utilizes the excellent fuels that are presently available but heats them to an optimum temperature range for entering the carburetor, while also holding down the pressure at which they enter the carburetor, since too much heat may result in too high a pressure.

Various approaches have been used in heating the gasoline, such as using exhaust gases or using the water cooling system.

The present invention uses the water cooling system, since that is more easily controlled and is at a somewhat lower temperature. It combines heat exchange with a control of the fuel temperature and in conjunction with the pressure regulation referred to above. Moreover, whereas many early fuel warming systems disregarded or did not use the fuel pump, the heat exchanger in the present invention is interposed between the fuel pump and the carburetor. Furthermore, the heat exchanger itself is placed in a position where it can be cooled, so that when the water circulating system tends to overheat the fuel, the circulating water is shut off from the heat exchanger, and the heat exchanger is cooled to retain the fuel at the desired range of temperatures, which lies preferably within the range of about 110° to 140° F., preferably depending on the season of the year and the general climate of the area.

SUMMARY OF THE INVENTION

The invention comprises interposing in the fuel conduit between the fuel pump and the carburetor a heat exchanger through which the gasoline passes, e.g., by means of a heat exchange coil. The invention also interposes between the heat exchanger and the carburetor a pressure regulator, which is located close to the carburetor and holds the pressure of the fuel down so that it enters the carburetor at a pressure of about 3 p.s.i. The heat exchanger is warmed by water from the water cooling system for the engine, with a heat sensor placed closely adjacent where the fuel enters the carburetor. Warm or hot water is sent to the heat exchanger until the temperature reaches a predetermined amount, which depends on the climate and season, e.g., about 110° to 120° F. in winter in northern California and about 125° to 145° F in the summer in northern California. When the temperature reaches the predetermined value, a switch shuts off the flow of the water and bypasses it from the heat exchanger. No special bypass is necessary since the invention itself includes a bypass from the regular coolant system.

Among the many advantages of the invention are that it can be used by any kind of water cooled engine without any changes on the car itself, and it is very easily installed as a separate item so that it can be retrofit to automobiles now in use.

Other objects and advantages of the invention will appear in the course of the final and detailed description of a preferred embodiment.

DESCRIPTION OF PREFERRED EMBODIMENTS OF THE INVENTION

Figure 1:
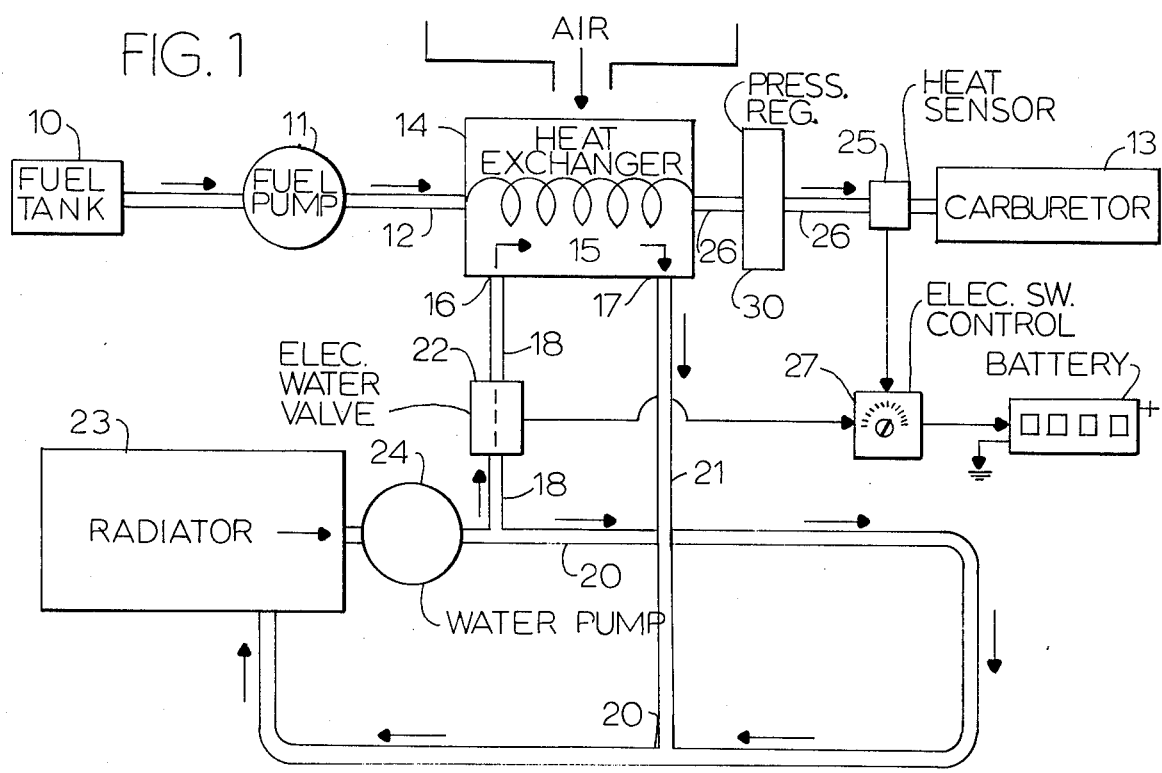
FIG. 1 is a diagram of a system embodying the principles of the invention.

The system shown in FIG. 1 represents diagrammatically a system embodying the principles of this invention. Thus, the fuel comes from a fuel tank 10 to a fuel pump 11 where it enters a conduit 12 and flows toward a carburetor 13. In this invention, a portion of the conduit 12 enters a heat exchanger 14, which is provided with a series of coils 15 for the conduit 12, to enable good heat exchange within a limited space. The heat exchanger 14 also has an inlet 16 for hot water and an outlet 17 for the same. The inlet 16 is connected by a conduit 18 to a water circulating conduit 20 of the engine cooling system, and the outlet 17 is also connected to the conduit 20 by a suitable conduit 21. A suitable closure valve 22 is preferably provided in the conduit 18 for enabling or preventing flow. The water cooling system for the engine includes, of course, a radiator 23 and a water pump 24.

A heat sensor 25 is provided immediately adjacent to the carburetor 13 to detect the temperatures of the fuel in a conduit 26 leading from the heat exchanger 14 to the carburetor 13. This sensor 25 controls an electric (preferably electronic) switch 27, which is actuated to close at a predetermined temperature and to open at a different predetermined temperature. When the switch 27 is closed, it opens the valve 22 so that water circulates from the conduit 20 via the conduit 18 through the heat exchanger 14 and then via the conduit 21 back to the conduit 18. This water is typically at temperatures up to some predetermined value, such as 170° F. or 180° F. or more. When the switch 27 is open, the valve 22 cuts off that circulation, and it does not come on again until the temperature has dropped well below the cut-off temperature. For example, the sensor 25 may be set to maintain a fuel temperature of about 115° F. turning off the switch 27 at 118° F. and turning it back on when the fuel temperature drops below about 112°, as indicated by the sensor 25. Other ranges may be used, but a range of about 5 or 6° is preferred, and the base temperature of the fuel may be set at different levels, between about 110° F. and about 140° F.

Figure 4:
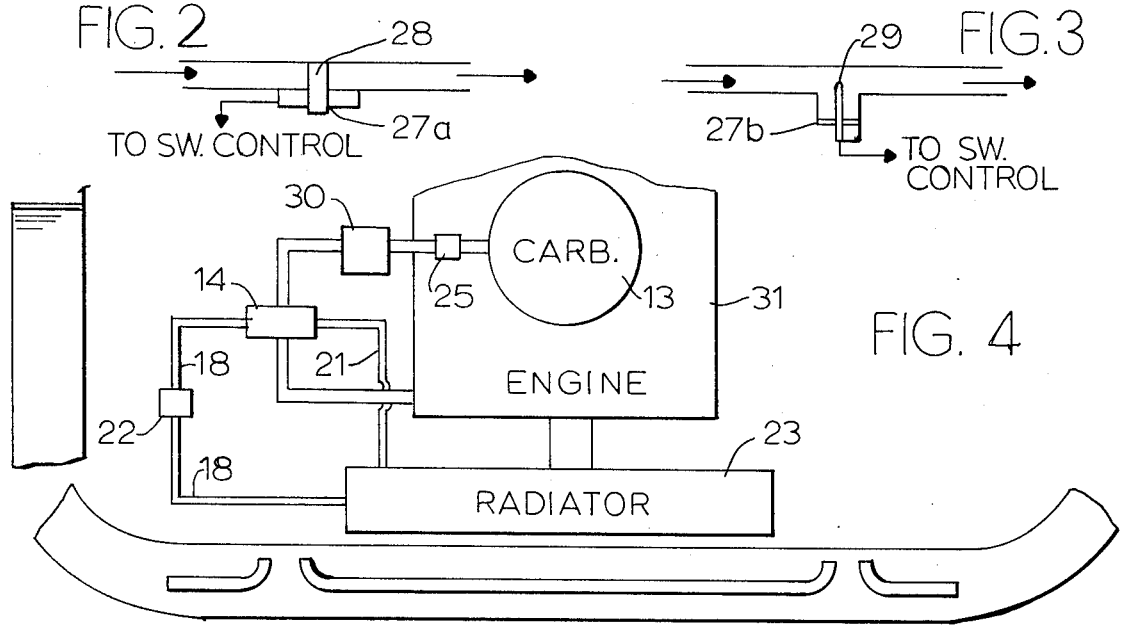
FIG. 4 is a view showing a location of the heat exchanger where it can receive adequate air cooling.

The heat exchanger 14 is located where it can have ready access to outside air, preferably to flowing air. In some cars this may mean that it will be located in front of the regular engine compartment; in many cars there is a suitable gap between the radiator 23 and the body to admit some cooling air and it can be located directly adjacent this gap. Or, as shown in FIG. 4, it may be located to one side of the engine, in any event, where it will be provided with cooling air. Since the air outside is almost always below the desired fuel temperature, and since the vehicle will usually be moving, there is adequate cooling to maintain the gasoline within the temperature set by the sensor 25 and the switch 27.

Figures 2, 3:
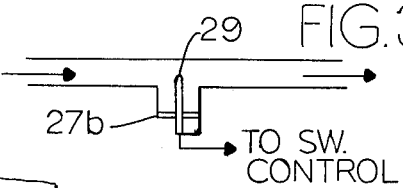
FIG. 2 is a fragmentary view, enlarged from FIG. 1, showing one type of heat sensor arrangement.
FIG. 3 is a view like FIG. 2 showing another type of heat sensor arrangement.

FIG. 2 shows a sensor 27a having a sleeve 28 extending around the conduit 26, sensing the fuel temperature through the walls of the conduit 26, while FIG. 3 shows a sensor 27b with a probe 29 inside the fuel line for direct contact with the fuel.

Also in this invention, I provide a pressure regulator 30 between the heat exchanger 14 and the carburetor 13 in the fuel conduit 26 (preferably upstream from the heat sensor 25) to insure that the fuel will enter the carburetor 13 at a pressure of about three p.s.i. The exact pressure may be modified somewhat from that, but that is approximately the correct amount.

I have found that this invention can be easily installed as an adjunct to the present system, requiring merely an interruption in the fuel line 12,26, with the heat exchanger 14 and regulator 30 interposed and the conduits 18 and 21 connected to the water cooling system 20, along with proper location of the heat exchanger 14. By doing this, the operation of the engine 31 can be much improved. Of course, the engine 31 should be in good condition for best results and should be properly in tune. When tuned carefully, the engine will benefit greatly from the present invention—if out of tune it will, of course, not work as well, in spite of the present invention. No short cuts are to be taken, and the fuel used should be the engine fuel that is specified by the manufacturer. The present invention does not attempt to enable the user to substitute low octane fuel for high octane fuel, or vice versa for that matter. It is apparent from what has been said that this invention applies to a water-cooled engine and to one that has a carburetor instead of to a fuel injection or air-cooled type of engine.

Figure 5:
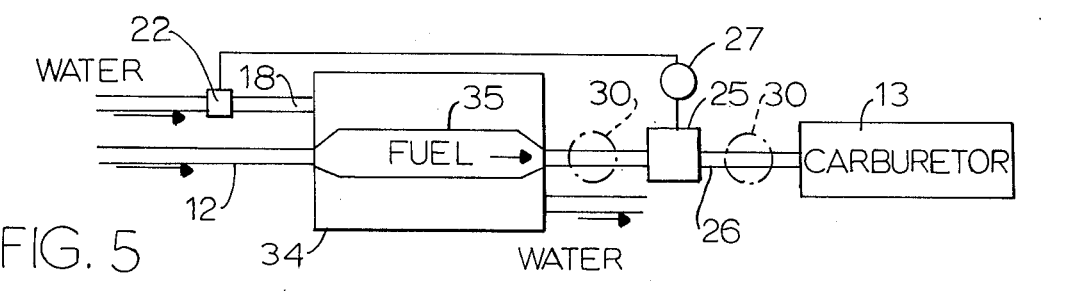
FIG. 5 is a diagrammatic view of a portion of a system like that of FIG. 1 showing some modifications.

FIG. 5 shows some minor modifications in the system. For one thing a heat exchanger 34 is shown wherein, in place of going to the coils 15, the fuel line 12 leads to a wider conduit 35 that slows its movement and then the fuel enters the conduit 26. Also, alternative positions are shown for the pressure regulator 30, either between the heat exchanger 34 and the heat sensor 25 or between the heat sensor 25 and the carburetor 13.

I have found that the ideal temperature tends to be between 110° to 145° F., the exact temperature depending on the car, the fuel, the climate and the general weather pattern, so that the optimum condition can be varied, preferably by adjusting the electric switch 27. By having about a 5 or 6° range, operation is usually easier, but the range can be narrower or somewhat broader, if desired. As will be seen, the water cooling system heats the fuel, and air cools the heat exchanger 14 when that is needed.

I have found in actual tests that the invention, when properly applied, results in a more complete burning of the fuel, and fewer hydrocarbons go out the exhaust pipe into the air, and that less unburned fuel goes into the oil so that the oil stays clean longer. All the carbon particles that tend to accumulate and contaminate the engine, causing wear, etc., are lessened by virtue of this more efficient burning of the hydrocarbons. When the automobile is started from a very cold start, the invention does nothing at first, but the gasoline, I have found, starts to be heated within a minute after the starting of the engine, and within about 4 minutes is up to the desired temperature range. Any stop after that, of course, results in the engine starting again easier and, during operation, there is better idling at the slow speeds, where most of the contamination tends to be formed.

One test of the invention, substantially as shown in FIGS. 1 and 2 was made in June, 1974 in the vicinity of Houston, Texas, during a time when the mean ambient temperature was between 91° and 93° F., and it was very humid. A Pontiac Catalina, 1973 model, with an air conditioner was used. The switch 27 was set for 130° F., i.e., to close the valve 22 when the temperature rose above 133° F. and to open it when the temperature dropped below 127° F. The same driver driving under substantially identical conditions had a gas mileage of 9 to 11 miles per gallon without the device of this invention installed. When it was installed he got 15 miles per gallon and the performance was greatly improved.

Another test in the same location was made with a 1974 Chrysler New Yorker, with the switch 27 set for 140° F. A more conservative driver found an increase in gas mileage of 4 miles per gallon over the same car without the device and under substantially the same conditions.

In Hayward, California, a 1969 LTD Ford was tested beginning in early 1973 with the switch set for 115° F. in winter and 140° F. in the summer. This car has been driven 18,000 miles and averages about 21 miles per gallon, whereas before installation of a device of this invention it averaged about 13 miles per gallon. It has more power as do all cars tested with this invention. While driving in the mountains near Reno, Nevada, at an altitude of about 6,000 feet above sea level, with gasoline temperature set at 140° F., an average of 19½ miles per gallon was obtained. Hydrocarbons emission were tested at 2.5 parts per million (permissible is 500 p.p.m.), and carbon monoxide emission of 0.9%, when 7% was permissible.

A 1971 Datsun with a 1600 c.c. engine obtained an increase in mileage from 24 to 32 miles per gallon when the device was installed and tested for 8000 miles at a fuel temperature of 140° F., as against uncontrolled gasoline temperature. Hydrocarbons emission was 1.5 p.p.m. (permissible being 3 p.p.m. for this car) and CO emission was 0.3% (permissible being 3%). This car also had more power at low speeds than formerly.

A 1969 Ford pickup truck having camp gear, an extra 50-gallon gas tank, and a camper shell was getting 10 m.p.g. before installation of this device. After installation and a setting of 115° F. (for winter driving, for there was snow and cold weather), the car got 16 m.p.g. on a 5000 mile trip. No emissions tests were made, but there was an improvement in power.

A 1973 Chevrolet station wagon with a 400 cubic-inch-displacement engine and air conditioning and all the power assists available, after installation of a device of this invention, set at 140° for summer, had an increase in mileage of 6 miles per gallon.

A 1969 Buick Electra, with a large engine, got 13 miles per gallon without the device, but with it got 19 m.p.g., the setting being 145° F. for the hot interior valley of California.

A 1973 Ford Torino with a 350 cubic-inch-displacement engine had been getting 13 miles per gallon for city driving; after installation of this device it got 19½ m.p.g. for city driving. It passed the smog test very well.

The temperature of the gasoline introduced into the carburetor was 140° F., for summer driving.

A 1973 Chevrolet station wagon engine with a 350 cubic-inch-displacement engine experienced an increase of 5 m.p.g. in city driving, at a setting of the fuel temperature of 140° F. for summer driving.

A 1973 Cadillac, for which no gasoline mileage tests are available, passed the smog test so well that it was run through three times under the impression that the instruments must be wrong. However, they were not wrong; this car (set for 145° F. fuel temperature) gave the lowest emissions of any car ever tested by those testing it.

In general, the hotter the climate, the hotter the fuel setting should be. However, it is also true that summer gasolines have less butane and other volatiles than winter gasolines.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. Apparatus for improving the efficiency of an automobile or truck engine and for reducing hydrocarbons in the exhaust, said engine having a fuel pump and a fuel line, a carburetor connected to said fuel line, and a water cooling system for cooling the engine, including in combination:

a heat exchanger connected in between said fuel pump and said carburetor for heating the fuel in said fuel line, and having an inlet and outlet for liquid from said water cooling system to supply the heat, a heat sensor connected to said fuel line closely adjacent said carburetor for sensing fuel temperature, an electric switch actuated by said heat sensor, opened thereby at a predetermined upper temperature and closed when the temperature drops below a predetermined lower temperature, a valve interposed between said water cooling system and said heat exchanger and actuated by closure of said switch to enable liquid flow when the temperature at said sensor is below a predetermined value and to cut off flow of said liquid when the temperature of said sensor rises above a higher predetermined value, and a pressure regulator between said heat exchanger and said carburetor for holding the pressure of fuel entering said carburetor at about three p.s.i.

2. The apparatus of claim 1 wherein said heat exchanger is located, relative to said engine, in a location where it can be cooled by air from exterior to said engine.

3. The apparatus of claim 1 wherein said electric switch is capable of manual adjustment to provide any fuel temperature between 110° and 145° F. at said heat sensor.

* * * * *